US011911339B1

(12) United States Patent
Lehel et al.

(10) Patent No.: US 11,911,339 B1
(45) Date of Patent: Feb. 27, 2024

(54) UNIVERSAL ADDITIVE PORT CAP

(71) Applicants: Peter Lehel, Boca Raton, FL (US); Jonathan Vitello, Ft. Lauderdale, FL (US)

(72) Inventors: Peter Lehel, Boca Raton, FL (US); Alexander Ollmann, Delray Beach, FL (US); Jonathan Vitello, Ft. Lauderdale, FL (US)

( * ) Notice: Subject to any disclaimer, the term of this patent is extended or adjusted under 35 U.S.C. 154(b) by 388 days.

(21) Appl. No.: 16/995,383

(22) Filed: Aug. 17, 2020

Related U.S. Application Data

(60) Provisional application No. 62/887,107, filed on Aug. 15, 2019.

(51) Int. Cl.
*A61J 1/14* (2023.01)
*B65D 41/34* (2006.01)

(52) U.S. Cl.
CPC ........ *A61J 1/1412* (2013.01); *B65D 41/3404* (2013.01); *A61J 2200/00* (2013.01)

(58) Field of Classification Search
CPC ............ B65D 2401/20; B65D 41/0421; B65D 41/3404; A61J 1/1412; A61J 2200/00
See application file for complete search history.

(56) References Cited

U.S. PATENT DOCUMENTS

| | | | |
|---|---|---|---|
| 722,943 | A | 3/1903 | Chappell |
| 732,662 | A | 6/1903 | Smith |
| 1,678,991 | A | 7/1928 | Marschalek |
| 1,970,631 | A | 8/1934 | Sherman |
| 2,477,598 | A | 8/1949 | Hain |
| 2,739,590 | A | 3/1956 | Yochem |
| 2,823,674 | A | 2/1958 | Yochem |
| 2,834,346 | A | 5/1958 | Adams |
| 2,875,761 | A | 3/1959 | Helmer et al. |
| 2,888,015 | A | 5/1959 | Hunt |
| 2,952,255 | A | 9/1960 | Hein, Jr. |

(Continued)

FOREIGN PATENT DOCUMENTS

| | | |
|---|---|---|
| DE | 202008018507 | 2/2015 |
| EP | 0148116 | 7/1985 |

(Continued)

OTHER PUBLICATIONS

Arai Tsugio, Pilfering Proof Cap, Jan. 1, 1996.

*Primary Examiner* — Shawn M Braden
(74) *Attorney, Agent, or Firm* — Malloy & Malloy, PL; Jennie S. Malloy

(57) ABSTRACT

A cap assembly universally structured for protectively enclosing differently dimensioned and configured additive ports of an IV container and including a housing, which may include a variably dimensioned interior, structured to receive the additive port therein, in an operative position. A cover is disposed in covering relation to the housing interior and a retaining structure is disposed within the housing in retaining engagement with the additive port. A closure structure is disposed on the housing in an attached orientation, structured to be resistant to detachment, concurrent to the operative position of the additive port within the housing. The operative position further includes the retaining structure disposed in retaining engagement with the additive port on the interior of the housing, concurrent to the attached orientation of said closure structure.

15 Claims, 4 Drawing Sheets

(56) References Cited

U.S. PATENT DOCUMENTS 3,122,280 A 2/1964 Goda
3,245,567 A 4/1966 Knight
3,323,798 A 6/1967 Miller
3,364,890 A 1/1968 Andersen
3,368,673 A 2/1968 R. Johnson
3,489,268 A 1/1970 Meierhoefer
3,574,306 A 4/1971 Alden
3,598,120 A 8/1971 Mass
3,610,241 A 10/1971 LeMarie
3,674,181 A 7/1972 Marks et al.
3,700,215 A 10/1972 Hardman et al.
3,706,307 A 12/1972 Hasson
3,712,749 A 1/1973 Roberts
3,726,445 A 4/1973 Ostrowsky et al.
3,747,751 A 7/1973 Miller et al.
3,850,329 A * 11/1974 Robinson ........... B65D 41/3404 215/254
3,872,867 A 3/1975 Killinger
3,904,033 A 9/1975 Haerr
3,905,375 A 9/1975 Toyama
3,937,211 A 2/1976 Merten
3,987,930 A 10/1976 Fuson
4,005,739 A 2/1977 Winchell
4,043,334 A 8/1977 Brown et al.
4,046,145 A 9/1977 Choksi et al.
4,068,696 A 1/1978 Winchell
4,106,621 A 8/1978 Sorenson
4,216,585 A 8/1980 Hatter
4,216,872 A 8/1980 Bean
4,244,366 A 1/1981 Raines
4,252,122 A 2/1981 Halvorsen
4,271,972 A 6/1981 Thor
4,286,591 A 9/1981 Raines
4,286,640 A 9/1981 Knox et al.
4,313,539 A 2/1982 Raines
4,369,781 A 1/1983 Gilson et al.
4,420,085 A 12/1983 Wilson et al.
4,430,077 A 2/1984 Mittleman et al.
4,457,445 A 7/1984 Hanks et al.
4,482,071 A 11/1984 Ishiwatari
D277,783 S 2/1985 Beck
4,521,237 A 6/1985 Logothetis
4,530,697 A 7/1985 Kuhlemann et al.
4,571,242 A 2/1986 Klien et al.
4,589,171 A 5/1986 McGill
4,664,259 A 5/1987 Landis
4,667,837 A 5/1987 Vitello et al.
4,676,530 A 6/1987 Nordgren et al.
4,693,707 A 9/1987 Dye
4,726,483 A 2/1988 Drozd
4,735,617 A 4/1988 Nelson et al.
4,742,910 A 5/1988 Staebler
4,743,229 A 5/1988 Chu
4,743,231 A 5/1988 Kay et al.
4,760,847 A 8/1988 Vaillancourt
4,813,564 A 3/1989 Cooper et al.
4,832,695 A 5/1989 Rosenberg et al.
4,834,706 A 5/1989 Beck et al.
4,842,592 A 6/1989 Caggiani et al.
4,844,906 A 7/1989 Hermelin et al.
4,906,231 A 3/1990 Young
4,919,285 A 4/1990 Roof et al.
4,936,445 A 6/1990 Grabenkort
5,009,323 A 4/1991 Montgomery et al.
5,024,323 A 6/1991 Bolton
5,049,129 A 9/1991 Zdeb et al.
D323,392 S 1/1992 Bryne
5,078,696 A 1/1992 Nedbaluk
5,085,332 A 2/1992 Gettig et al.
5,090,564 A 2/1992 Chimienti
5,133,454 A 7/1992 Hammer
5,135,496 A 8/1992 Vetter et al.
5,163,922 A 11/1992 McElveen, Jr. et al.
5,165,560 A 11/1992 Ennis, III et al.
5,230,429 A 7/1993 Etheredge, III
5,267,983 A 12/1993 Oilschlager et al.
5,292,308 A 3/1994 Ryan
5,293,993 A 3/1994 Yates, Jr. et al.
5,295,599 A 3/1994 Smith
5,312,367 A 5/1994 Nathan
5,312,368 A 5/1994 Haynes
5,328,466 A 7/1994 Denmark
5,328,474 A 7/1994 Raines
5,356,380 A 10/1994 Hoekwater et al.
5,370,226 A 12/1994 Gollobin et al.
5,380,295 A 1/1995 Vacca
5,402,887 A 4/1995 Shillington
5,405,339 A 4/1995 Kohnen et al.
5,456,668 A 10/1995 Ogle, II
5,458,580 A 10/1995 Hajishoreh
5,468,224 A 11/1995 Souryal
5,474,178 A 12/1995 DiViesti et al.
5,505,705 A 4/1996 Galpin et al.
5,531,695 A 7/1996 Swisher
5,540,666 A 7/1996 Barta et al.
5,549,571 A 8/1996 Sak
5,558,648 A 9/1996 Shields
5,584,817 A 12/1996 van den Haak
5,588,239 A 12/1996 Anderson
5,617,954 A 4/1997 Kato et al.
5,624,402 A 4/1997 Imbert
5,662,233 A 9/1997 Reid
5,674,209 A 10/1997 Yarger
5,695,470 A 12/1997 Roussigne et al.
5,700,247 A 12/1997 Grimard et al.
5,702,374 A 12/1997 Johnson
5,713,485 A 2/1998 Lift et al.
5,776,124 A 7/1998 Wald
5,785,691 A 7/1998 Vetter et al.
5,797,885 A 8/1998 Rubin
5,807,343 A 9/1998 Tucker et al.
5,829,589 A 11/1998 Nguyen et al.
D402,766 S 12/1998 Smith et al.
5,842,567 A 12/1998 Rowe et al.
5,876,381 A 3/1999 Pond et al.
5,883,806 A 3/1999 Meador et al.
5,884,457 A 3/1999 Ortiz et al.
5,902,269 A 5/1999 Jentzen
5,926,922 A * 7/1999 Stottle ...................... H05B 3/58 24/23 R
5,951,522 A 9/1999 Rosato et al.
5,951,525 A 9/1999 Thorne et al.
5,954,657 A 9/1999 Rados
5,957,166 A 9/1999 Safabash
5,957,314 A 9/1999 Nishida et al.
5,963,136 A 10/1999 O'Brien
5,989,227 A 11/1999 Vetter et al.
5,993,437 A 11/1999 Raoz
6,000,548 A 12/1999 Tsals
D419,671 S 1/2000 Jansen
6,021,824 A 2/2000 Larsen et al.
6,027,482 A 2/2000 Imbert
6,068,614 A 5/2000 Kimber et al.
D430,293 S 8/2000 Jansen
D431,864 S 10/2000 Jansen
6,126,640 A 10/2000 Tucker et al.
6,190,364 B1 2/2001 Imbert
6,193,688 B1 2/2001 Balestracci et al.
6,196,593 B1 3/2001 Petrick et al.
6,196,998 B1 3/2001 Jansen et al.
6,216,885 B1 4/2001 Guillaume
6,279,746 B1 4/2001 Hussaini et al.
6,235,376 B1 5/2001 Miyazaki et al.
6,280,418 B1 8/2001 Reinhard et al.
6,287,671 B1 9/2001 Bright et al.
6,322,543 B1 11/2001 Singh et al.
6,338,200 B1 1/2002 Baxa et al.
6,358,241 B1 3/2002 Shapeton et al.
6,375,640 B1 4/2002 Teraoka
6,394,983 B1 5/2002 Mayoral et al.
6,439,276 B1 8/2002 Wood et al.
6,485,460 B2 11/2002 Eakins et al.
6,488,666 B1 12/2002 Geist
6,491,665 B1 12/2002 Vetter et al.

(56) References Cited

U.S. PATENT DOCUMENTS

| | | | |
|---|---|---|---|
| 6,500,155 | B2 | 12/2002 | Sasso |
| 6,520,935 | B1 | 2/2003 | Jansen et al. |
| 6,540,697 | B2 | 4/2003 | Chen |
| 6,565,529 | B1 | 5/2003 | Kimber et al. |
| 6,581,792 | B1 | 6/2003 | Limanjaya |
| 6,585,691 | B1 | 7/2003 | Vitello |
| 6,592,251 | B2 | 7/2003 | Edwards et al. |
| 6,666,852 | B2 | 12/2003 | Niedospial, Jr. |
| 6,682,798 | B1 | 1/2004 | Kiraly |
| 6,726,652 | B2 | 4/2004 | Eakins et al. |
| 6,726,672 | B1 | 4/2004 | Hanly et al. |
| 6,764,469 | B2 | 7/2004 | Broselow |
| 6,796,586 | B2 | 9/2004 | Werth |
| 6,821,268 | B2 | 11/2004 | Balestracci |
| D501,549 | S | 2/2005 | McAllister et al. |
| 6,921,383 | B2 | 7/2005 | Vitello |
| 6,935,560 | B2 | 8/2005 | Andreasson et al. |
| 6,942,643 | B2 | 9/2005 | Eakins et al. |
| 7,036,661 | B2 | 5/2006 | Anthony et al. |
| 7,055,273 | B2 | 6/2006 | Roshkoff |
| 7,100,771 | B2 | 9/2006 | Massengale et al. |
| 7,125,397 | B2 | 10/2006 | Woehr et al. |
| 7,141,286 | B1 | 11/2006 | Kessler et al. |
| 7,175,081 | B2 | 2/2007 | Andreasson et al. |
| 7,182,256 | B2 | 2/2007 | Andreasson et al. |
| 7,232,066 | B2 | 6/2007 | Anderasson et al. |
| 7,240,926 | B2 | 7/2007 | Dalle et al. |
| 7,299,981 | B2 | 11/2007 | Hickle et al. |
| 7,374,555 | B2 | 5/2008 | Heinz et al. |
| 7,404,500 | B2 | 7/2008 | Marteau et al. |
| 7,410,803 | B2 | 8/2008 | Nollert et al. |
| 7,425,208 | B1 | 9/2008 | Vitello |
| 7,437,972 | B2 | 10/2008 | Yeager |
| D581,046 | S | 11/2008 | Sudo |
| D581,047 | S | 11/2008 | Koshidaka |
| D581,049 | S | 11/2008 | Sudo |
| 7,482,166 | B2 | 1/2009 | Nollert et al. |
| D589,612 | S | 3/2009 | Sudo |
| 7,497,330 | B2 | 3/2009 | Anthony et al. |
| 7,503,453 | B2 | 3/2009 | Cronin et al. |
| 7,588,563 | B2 | 9/2009 | Guala |
| 7,594,681 | B2 | 9/2009 | DeCarlo |
| 7,608,057 | B2 | 10/2009 | Woehr et al. |
| 7,611,487 | B2 | 11/2009 | Woehr et al. |
| 7,632,244 | B2 | 12/2009 | Buehler et al. |
| D608,900 | S | 1/2010 | Giraud et al. |
| 7,641,636 | B2 | 1/2010 | Moesli et al. |
| D612,939 | S | 3/2010 | Boone, III et al. |
| 7,681,606 | B2 | 3/2010 | Khan et al. |
| 7,698,180 | B2 | 4/2010 | Fago et al. |
| 7,735,664 | B1 | 6/2010 | Peters et al. |
| 7,748,892 | B2 | 7/2010 | McCoy |
| 7,762,988 | B1 | 7/2010 | Vitello |
| 7,766,919 | B2 | 8/2010 | Delmotte |
| 7,802,313 | B2 | 9/2010 | Czajka |
| 7,886,908 | B2 | 2/2011 | Farrar et al. |
| 7,918,830 | B2 | 4/2011 | Langan et al. |
| 7,922,213 | B2 | 4/2011 | Werth |
| 8,034,041 | B2 | 10/2011 | Domkowski et al. |
| 8,079,518 | B2 | 12/2011 | Turner et al. |
| 8,091,727 | B2 | 1/2012 | Domkowwski |
| 8,118,788 | B2 | 2/2012 | Frezza |
| 8,137,324 | B2 | 3/2012 | Bobst |
| 8,140,349 | B2 | 3/2012 | Hanson et al. |
| 8,252,247 | B2 | 8/2012 | Ferlic |
| 8,257,286 | B2 | 9/2012 | Meyer et al. |
| 8,328,082 | B1 | 12/2012 | Bochenko et al. |
| 8,348,895 | B1 | 1/2013 | Vitello |
| 8,353,869 | B2 | 1/2013 | Ranalletta et al. |
| 8,413,811 | B1 | 4/2013 | Arendt |
| 8,443,999 | B1 | 5/2013 | Reinders |
| D684,057 | S | 6/2013 | Kwon |
| 8,512,277 | B2 | 8/2013 | Del Vecchio |
| 8,528,757 | B2 | 9/2013 | Bisio |
| 8,556,074 | B2 | 10/2013 | Turner et al. |
| 8,579,116 | B2 | 11/2013 | Pether et al. |
| 8,591,462 | B1 | 11/2013 | Vitello |
| 8,597,255 | B2 | 12/2013 | Emmott et al. |
| 8,597,271 | B2 | 12/2013 | Langan et al. |
| 8,616,413 | B2 | 12/2013 | Koyama |
| D701,304 | S | 3/2014 | Lair et al. |
| 8,672,902 | B2 | 3/2014 | Ruan et al. |
| 8,702,674 | B2 | 4/2014 | Bochenko |
| 8,777,910 | B2 | 7/2014 | Bauss et al. |
| 8,777,930 | B2 | 7/2014 | Swisher et al. |
| 8,852,561 | B2 | 10/2014 | Wagner et al. |
| 8,864,021 | B1 | 10/2014 | Vitello |
| 8,864,707 | B1 | 10/2014 | Vitello |
| 8,864,708 | B1 | 10/2014 | Vitello |
| 8,911,424 | B2 | 12/2014 | Weadock et al. |
| 8,945,082 | B2 | 2/2015 | Geiger et al. |
| 9,016,473 | B2 | 4/2015 | Tamarindo |
| 9,082,157 | B2 | 7/2015 | Gibson |
| 9,101,534 | B2 | 8/2015 | Bochenko |
| D738,495 | S | 9/2015 | Strong et al. |
| 9,125,976 | B2 | 9/2015 | Uber, III et al. |
| D743,019 | S | 11/2015 | Schultz |
| 9,199,042 | B2 | 12/2015 | Farrar et al. |
| 9,199,749 | B1 | 12/2015 | Vitello et al. |
| 9,220,486 | B2 | 12/2015 | Schweiss et al. |
| 9,220,577 | B2 | 12/2015 | Jessop et al. |
| D750,228 | S | 2/2016 | Strong et al. |
| 9,272,099 | B2 | 3/2016 | Limaye et al. |
| 9,311,592 | B1 | 4/2016 | Vitello et al. |
| D756,777 | S | 5/2016 | Berge et al. |
| 9,336,669 | B2 | 5/2016 | Bowden et al. |
| D759,486 | S | 6/2016 | Ingram et al. |
| D760,384 | S | 6/2016 | Niunoya et al. |
| D760,902 | S | 7/2016 | Persson |
| 9,402,967 | B1 | 8/2016 | Vitello |
| 9,427,715 | B2 | 8/2016 | Palazzolo et al. |
| 9,433,768 | B2 | 9/2016 | Tekeste et al. |
| 9,463,310 | B1 | 10/2016 | Vitello |
| D773,043 | S | 11/2016 | Ingram et al. |
| D777,903 | S | 1/2017 | Schultz |
| 9,662,456 | B2 | 5/2017 | Woehr |
| D789,529 | S | 6/2017 | Davis et al. |
| 9,687,249 | B2 | 6/2017 | Hanlon et al. |
| 9,744,304 | B2 | 8/2017 | Swift et al. |
| D797,928 | S | 9/2017 | Davis et al. |
| D797,929 | S | 9/2017 | Davis et al. |
| 9,764,098 | B2 | 9/2017 | Hund et al. |
| 9,821,152 | B1 | 11/2017 | Vitello et al. |
| D806,241 | S | 12/2017 | Swinney et al. |
| D807,503 | S | 1/2018 | Davis et al. |
| 9,855,191 | B1 | 1/2018 | Vitello et al. |
| D815,945 | S | 4/2018 | Fischer |
| 9,987,438 | B2 | 6/2018 | Stillson |
| D825,746 | S | 8/2018 | Davis et al. |
| 10,039,913 | B2 | 8/2018 | Yeh et al. |
| D831,201 | S | 10/2018 | Holtz et al. |
| D834,187 | S | 11/2018 | Ryan |
| 10,124,122 | B2 | 11/2018 | Zenker |
| 10,166,343 | B1 | 1/2019 | Hunt et al. |
| 10,166,347 | B1 | 1/2019 | Vitello |
| 10,183,129 | B1 | 1/2019 | Vitello |
| 10,207,099 | B1 | 2/2019 | Vitello |
| D842,464 | S | 3/2019 | Davis et al. |
| D847,373 | S | 4/2019 | Hurwit et al. |
| 10,300,263 | B1 | 5/2019 | Hunt |
| 10,307,548 | B1 | 6/2019 | Hunt et al. |
| 10,315,024 | B1 | 6/2019 | Vitello et al. |
| 10,315,808 | B2 | 6/2019 | Taylor et al. |
| 10,376,655 | B2 | 8/2019 | Pupke et al. |
| D859,125 | S | 9/2019 | Weagle et al. |
| 10,478,262 | B2 | 11/2019 | Niese et al. |
| 10,758,684 | B1 | 9/2020 | Vitello et al. |
| 10,773,067 | B2 | 9/2020 | Davis et al. |
| 10,888,672 | B1 | 1/2021 | Vitello |
| 10,898,659 | B1 | 1/2021 | Vitello et al. |
| 10,912,898 | B1 | 2/2021 | Vitello et al. |
| 10,933,202 | B1 | 3/2021 | Banik |
| 10,953,162 | B1 | 3/2021 | Hunt et al. |
| 11,040,149 | B1 | 6/2021 | Banik |

(56) References Cited

U.S. PATENT DOCUMENTS

| | | | |
|---|---|---|---|
| 11,040,154 B1 | 6/2021 | Vitello et al. | |
| 11,097,071 B1 | 8/2021 | Hunt et al. | |
| 11,278,681 B1 | 3/2022 | Banik et al. | |
| D948,713 S | 4/2022 | Banik | |
| 11,357,588 B1 | 6/2022 | Vitello et al. | |
| 11,413,406 B1 | 8/2022 | Vitello et al. | |
| 11,426,328 B1 | 8/2022 | Ollmann et al. | |
| 11,471,610 B1 | 10/2022 | Banik et al. | |
| 11,523,970 B1 | 12/2022 | Vitello et al. | |
| 11,541,180 B1 | 1/2023 | Vitello et al. | |
| 2001/0034506 A1 | 10/2001 | Hirschman et al. | |
| 2001/0056258 A1 | 12/2001 | Evans | |
| 2002/0007147 A1 | 1/2002 | Capes et al. | |
| 2002/0023409 A1 | 2/2002 | Py | |
| 2002/0046962 A1 | 4/2002 | Vallans et al. | |
| 2002/0079281 A1 | 6/2002 | Hierzer et al. | |
| 2002/0097396 A1 | 7/2002 | Schafer | |
| 2002/0099334 A1 | 7/2002 | Hanson et al. | |
| 2002/0101656 A1 | 8/2002 | Blumenthal et al. | |
| 2002/0104770 A1 | 8/2002 | Shapeton et al. | |
| 2002/0133119 A1 | 9/2002 | Eakins et al. | |
| 2003/0055685 A1 | 3/2003 | Cobb et al. | |
| 2003/0146617 A1 | 8/2003 | Franko, Sr. | |
| 2003/0183547 A1 | 10/2003 | Heyman | |
| 2003/0187403 A1 | 10/2003 | Balestracci | |
| 2004/0008123 A1 | 1/2004 | Carrender et al. | |
| 2004/0064095 A1 | 4/2004 | Vitello | |
| 2004/0116858 A1 | 6/2004 | Heinz et al. | |
| 2004/0173563 A1 | 9/2004 | Kim et al. | |
| 2004/0186437 A1 | 9/2004 | Frenette et al. | |
| 2004/0225258 A1 | 11/2004 | Balestracci | |
| 2005/0146081 A1 | 7/2005 | MacLean et al. | |
| 2005/0148941 A1 | 7/2005 | Farrar et al. | |
| 2005/0209555 A1 | 9/2005 | Middleton et al. | |
| 2006/0084925 A1 | 4/2006 | Ramsahoye | |
| 2006/0089601 A1 | 4/2006 | Dionigi | |
| 2006/0169611 A1 | 8/2006 | Prindle | |
| 2006/0173415 A1 | 8/2006 | Cummins | |
| 2006/0189933 A1 | 8/2006 | Alheidt et al. | |
| 2007/0060898 A1 | 3/2007 | Shaughnessy et al. | |
| 2007/0106234 A1 | 5/2007 | Klein | |
| 2007/0142786 A1 | 6/2007 | Lampropoulos et al. | |
| 2007/0191690 A1 | 8/2007 | Hasse et al. | |
| 2007/0219503 A1 | 9/2007 | Loop et al. | |
| 2007/0257111 A1 | 11/2007 | Ortenzi | |
| 2008/0068178 A1 | 3/2008 | Meyer | |
| 2008/0097310 A1 | 4/2008 | Buehler et al. | |
| 2008/0106388 A1 | 5/2008 | Knight | |
| 2008/0140020 A1 | 6/2008 | Shirley | |
| 2008/0243088 A1 | 10/2008 | Evans | |
| 2008/0303267 A1 | 12/2008 | Schnell et al. | |
| 2008/0306443 A1 | 12/2008 | Neer | |
| 2009/0084804 A1 | 4/2009 | Caspary et al. | |
| 2009/0099552 A1 | 4/2009 | Levy et al. | |
| 2009/0149815 A1 | 6/2009 | Kiel et al. | |
| 2009/0166311 A1 | 7/2009 | Claessens | |
| 2009/0326481 A1 | 12/2009 | Swisher et al. | |
| 2010/0050351 A1 | 3/2010 | Colantonio et al. | |
| 2010/0084403 A1 | 4/2010 | Popish et al. | |
| 2010/0126894 A1 | 5/2010 | Koukol et al. | |
| 2010/0179822 A1 | 7/2010 | Reppas | |
| 2010/0228226 A1 | 9/2010 | Nielsen | |
| 2010/0252564 A1 | 10/2010 | Martinez et al. | |
| 2010/0283238 A1 | 11/2010 | Deighan et al. | |
| 2011/0044850 A1 | 2/2011 | Solomon et al. | |
| 2011/0046550 A1 | 2/2011 | Schiller et al. | |
| 2011/0046603 A1 | 2/2011 | Felsovalyi et al. | |
| 2012/0064515 A2 | 3/2012 | Knapp et al. | |
| 2012/0096957 A1 | 4/2012 | Ochman | |
| 2012/0110950 A1 | 5/2012 | Schraudolph | |
| 2013/0018356 A1 | 1/2013 | Prince et al. | |
| 2013/0056130 A1 | 3/2013 | Alpert et al. | |
| 2013/0088354 A1 | 4/2013 | Thomas | |
| 2013/0237949 A1 | 9/2013 | Miller | |
| 2013/0269592 A1 | 10/2013 | Heacock et al. | |
| 2014/0000781 A1 | 1/2014 | Franko, Jr. | |
| 2014/0034536 A1 | 2/2014 | Reinhardt et al. | |
| 2014/0069202 A1 | 3/2014 | Fisk | |
| 2014/0069829 A1 | 3/2014 | Evans | |
| 2014/0076840 A1 | 3/2014 | Graux et al. | |
| 2014/0135738 A1 | 5/2014 | Panian | |
| 2014/0155868 A1 | 6/2014 | Nelson et al. | |
| 2014/0163465 A1 | 6/2014 | Bartlett, II et al. | |
| 2014/0257843 A1 | 9/2014 | Adler et al. | |
| 2014/0326727 A1 | 11/2014 | Jouin et al. | |
| 2014/0353196 A1 | 12/2014 | Key | |
| 2015/0013811 A1 | 1/2015 | Carrel et al. | |
| 2015/0048045 A1 | 2/2015 | Miceli et al. | |
| 2015/0112296 A1 | 4/2015 | Ishiwata et al. | |
| 2015/0136632 A1 | 5/2015 | Moir et al. | |
| 2015/0182686 A1 | 7/2015 | Okihara | |
| 2015/0191633 A1 | 7/2015 | De Boer et al. | |
| 2015/0246185 A1 | 9/2015 | Heinz | |
| 2015/0302232 A1* | 10/2015 | Strassburger ...... | B65D 43/0235<br>340/10.1 |
| 2015/0305982 A1 | 10/2015 | Bochenko | |
| 2015/0310771 A1 | 10/2015 | Atkinson et al. | |
| 2016/0067422 A1 | 3/2016 | Davis et al. | |
| 2016/0090456 A1 | 3/2016 | Ishimaru et al. | |
| 2016/0136352 A1 | 5/2016 | Smith et al. | |
| 2016/0144119 A1 | 5/2016 | Limaye et al. | |
| 2016/0158110 A1 | 6/2016 | Swisher et al. | |
| 2016/0158449 A1 | 6/2016 | Limaye et al. | |
| 2016/0176550 A1 | 6/2016 | Viitello et al. | |
| 2016/0194121 A1 | 7/2016 | Ogawa et al. | |
| 2016/0250420 A1 | 9/2016 | Maritan et al. | |
| 2016/0279032 A1 | 9/2016 | Davis | |
| 2016/0328586 A1 | 11/2016 | Bowden et al. | |
| 2016/0361235 A1 | 12/2016 | Swisher | |
| 2016/0367439 A1 | 12/2016 | Davis et al. | |
| 2017/0007771 A1 | 1/2017 | Duinat et al. | |
| 2017/0014310 A1 | 1/2017 | Hyun et al. | |
| 2017/0124289 A1 | 5/2017 | Hasan et al. | |
| 2017/0173321 A1 | 6/2017 | Davis et al. | |
| 2017/0203086 A1 | 7/2017 | Davis | |
| 2017/0225843 A1 | 8/2017 | Glaser et al. | |
| 2017/0239141 A1 | 8/2017 | Davis et al. | |
| 2017/0297781 A1 | 10/2017 | Kawamura | |
| 2017/0319438 A1 | 11/2017 | Davis et al. | |
| 2017/0354792 A1 | 12/2017 | Ward | |
| 2018/0001540 A1 | 1/2018 | Byun | |
| 2018/0014998 A1 | 1/2018 | Yuki et al. | |
| 2018/0064604 A1 | 3/2018 | Drmanovic | |
| 2018/0078684 A1 | 3/2018 | Peng et al. | |
| 2018/0089593 A1 | 3/2018 | Patel et al. | |
| 2018/0098915 A1 | 4/2018 | Rajagopal et al. | |
| 2018/0147115 A1 | 5/2018 | Nishioka et al. | |
| 2019/0388626 A1 | 12/2019 | Okihara | |
| 2022/0008645 A1 | 1/2022 | Ukai et al. | |

FOREIGN PATENT DOCUMENTS

| | | |
|---|---|---|
| GB | 486367 | 6/1938 |
| JP | 08002544 | 1/1996 |
| KR | 101159987 | * 12/2012 |
| WO | WO2008000279 | 1/2008 |
| WO | WO2017086607 | 5/2015 |

* cited by examiner

UNIVERSAL ADDITIVE PORT CAP

CLAIM OF PRIORITY

This patent application claims priority to a currently pending U.S. Provisional patent application having Ser. No. 62/887,107 and a filing date of Aug. 15, 2019, the contents of which are incorporated herein by reference it its entirety.

FIELD OF THE INVENTION

The present invention is directed to universally structured cap assembly disposable in a removal resistant, protective, operative position, relative to any one of a plurality of differently dimensioned and configured additive ports of an IV container. Access to the additive port is only accomplished by partial destruction of the cap assembly, thereby providing a tamper evident indication of such access.

DESCRIPTION OF THE RELATED ART

In numerous medical care facilities, it is common practice to administer various medications to a patient either orally or by injection. As a result, a number of syringes, IV bags, medication carrying containers, etc. may be pre-loaded within or supplied to the medical care facility and subsequently stored at different locations throughout the facility. For example, at large medical facilities, preloaded syringes or other administering containers may be delivered to multiple nurses' stations. Because of the remote location of many nurse's stations, however, a pre-loaded syringe is very often given to other personnel for delivery or subsequent dosing of the patient by a duly qualified nurse or another person with medical training.

Also, in the case of a very expensive drug or an addictive type drug such as, but not limited to, morphine, there is a danger that the pre-loaded container will be tampered with at some point, by a person seeking to improperly gain unauthorized access to the drug. This possibility can present real danger when unauthorized access to the contents of the preloaded syringe, IV bag or other container is accomplished. One possible outcome of such a situation includes the inappropriate substitution of some other, unauthorized substance in the syringe, IV container, etc. By way of example only, if saline solution were substituted for a dose of morphine, this could have extremely serious consequences. Thus, there is a problem of determining if a sealed, preloaded medication container has, or has not, been exposed to contamination or might otherwise have been compromised by it being tampered with. This and related types of problems have been described in a U.S. Pat. No. 4,667,837 previously granted and listing one of the inventors named herein.

However, certain problems remain in the relevant field of art, despite the introduction of products such as those represented in the above noted patent. Such problems can be related to the manufacturing thereof in a manner which is relatively easy and inexpensive, as well as to other problems involved with the assembly and placement of a protective, tamper evident structure onto a drug loaded container. Also, additional problems relate to the maintenance of sterility during storage at the manufacturing facility and/or during transport to and throughout the various medical facilities where they are used. Accordingly, the present invention seeks to address such problems and others associated with the handling of protective shields, end caps, closures, etc. used with medication administering or storage containers during their manufacture, assembly, and administration.

Further by way of example, in hospital pharmacies and/or authorized, outsourced pharmacy compounding facilities, IV bag preparations are becoming more common. In parallel, there is a significant increase in different manufacturers entering the market and producing IV bags having different dimensions, configurations and overall structural designs. While the IV tube set connections of IV bag ports are standardized, the medication port or "additive port" varies in size, shape and material. As such, caps or closures for such additive ports are intended to provide tamper evident capabilities, which preferably provide visual indication to the medical personnel, that medication has been added or access has been attempted to the contents of the IV bag, via the additive port. However, currently and/or known additive port caps are specifically designed to be compatible with a single brand of IV bags, using the same type and/or design of the attendant additive port.

Therefore, there is a need in this area for an improved, tamper evident cap or shield which is capable of "universal" use in the sense of protecting differently designed or structured additive ports of IV containers, thereby overcoming problems and/or disadvantages of the type set forth above and known in the art. If any such improved tamper evident cap were developed, it would preferably have certain appropriate and advantageous structural and operative features. Such features may include, but would not be limited to, a construction and design facilitating appropriate protective connection to or mounting on an additive port of an IV container. In addition, if any such improved tamper evident cap were developed, it would preferably also be structured to provide a clear and unmistakable indication of tampering or previous attempted access to the contents of the IV bag, via the additive port.

Accordingly, the structuring of any such proposed tamper evident additive port cap should facilitate its use with additive ports, regardless of their brand, category, dimension, configuration and/or material. Any such preventive, tamper evident structuring of a proposed additive port cap may include a complete or partial destruction of thereof, to provide clear visual evidence of an attempted tampering or access. Finally, if any such improved tamper evident additive port cap were developed, it should be structurally and operatively reliable, while capable of quick and easy attachment thereof in a shielding, protecting position relative to the additive port associated with the IV bag or like medical container.

SUMMARY OF THE INVENTION

The present invention is directed to a tamper evident cap or shield assembly which is capable of "universal" use in the sense of being connectable in a protective, access restricting position to any one of a plurality of differently designed or structured additive ports of an IV container.

Accordingly, in one or more preferred embodiments, the present invention comprises a housing structured to receive the additive port within the housing in an operative position. An access opening is formed in the housing in communicating relation with the housing interior and is dimensioned to facilitate access of the additive port there through into the interior of the housing. A cover is connected to the housing in substantially opposing relation to the access opening. As such, the cover is disposed and structured to prevent access to the port, such as by a syringe or other substance administering instrument. In turn, the cover will prevent access to the port septum, once the cap assembly is in the aforementioned operative position relative to the contained additive port.

In order to maintain the additive port within the housing interior and further restrict removal of the cap assembly therefrom, the housing includes a retaining structure disposed preferably and/or at least partially within the housing interior. The retaining structure may assume various different structural configurations, all of which are commonly operative by being disposed in retaining relation with the contained additive port. Further, when the cap assembly and additive port are in the operative position, the retaining structure will be positioned and/or disposed to apply a retaining engagement therewith such as, but not limited to, when the port is attempted to be removed through the access opening. In addition, a closure structure is disposed on the housing and is selectively positionable into an attached orientation, concurrent to the cap assembly and additive port being in the operative position, relative to the contained additive port.

Common structural and operative features of at least some of the one or more preferred embodiments of the universal additive port cap assembly of the present invention comprise the closure structure including a retention assembly including a plurality of retention segments. In more specific terms, the retention assembly is preferably, but not necessarily, in the form of a ratchet assembly including a plurality of ratchet segments. The plurality of at least two ratchet segments are adjustably disposable in fixed, mating engagement with one another when the closure structure is in the attached orientation. Also, the fixed mating engagement of the ratchet or other retention segments comprises a detachment preventive disposition of the closure structure. Therefore, the fixed mating engagement may further comprise and be at least partially defined by an at least partially enclosed, access restrictive disposition of the plurality of ratchet or retention segments. As will be explained in greater detail hereinafter with specific reference to the closure structure, the fixed mating engagement of the closure structure further comprises it being disposed in at least partially closing and/or clamping relation to the housing. Therefore, the attached orientation of the closure structure facilitates the variable dimensioning, configuring and/or positioning of the housing so as to conform to a contained one of a possible plurality of differently structured additive ports, disposed within the housing interior when the cap assembly is in the operative position.

Therefore, while the one or more preferred embodiments of the universal additive port cap assembly of the present invention may include at least some different structural and operative features, the commonality of each embodiment includes the operative position of the cap assembly having the retaining structure disposed in retaining engagement with the contained additive port, concurrent to the closure structure being in the aforementioned attached orientation.

Accordingly, one preferred embodiment of the universal additive port cap assembly of the present invention includes the housing having a flexible side wall movably connected to the cover and adjustably positioned to define a variable dimension and/or configuration of the housing and/or housing interior. More specifically, the "universal" nature of the cap assembly includes the interior dimension, configuration, and/or position of the housing so as to correspond and adapt to the dimension, configuration and overall structure of any one of a possible plurality of different additive ports, which are disposed therein. Moreover, the ability to selectively vary the dimension, configuration and/or disposition of the housing, the housing interior, the retaining structure and the closure structure relative to one another enables its "universal" use, as described herein, with any one of a possible plurality of different additive ports of an IV container.

In addition, one embodiment of the cap assembly comprises the flexible side wall having an open configuration. The open configuration is at least partially defined by an open space disposed between spaced apart, but substantially correspondingly positioned, free longitudinal ends or sides of the sidewall. The aforementioned variance of the housing, including its interior. to accommodate additive ports of different structures is further facilitated by the closure structure disposed in overlying, covering and/or closing relation to the open space of the open configuration. Therefore, selective positioning of the closure structure in the attached orientation will result in an at least partial closure and flexing of the flexible side wall. The flexible side wall will then be forcibly disposed in surrounding, at least partially confronting relation, to the additive port disposed within the housing interior. This in turn will result in the retaining structure disposed in the aforementioned retaining engagement with the contained additive port, specifically but not exclusively, if the contained additive port is attempted to be removed through the access opening. The operative position of the additive port top assembly is thereby further defined.

As set forth above, each of the one or more embodiments of the additive port cap assembly may include tamper evident capabilities. As indicated herein, the flexible side wall of this embodiment of the cap assembly is movably and removably connected to a cover, wherein the cover is disposed in overlying relation to the housing interior and in access preventing relation to the additive port. A frangible structure, including at least one frangible member serves to removably interconnect the cover to the movable, flexible side wall. Therefore, access to the additive port within the housing interior may be accomplished by a removal and/or breakage of the frangible member, thereby removing the cover from its access restricting position relative to the contained additive port. Such breakage, removal or distortion of the cover relative to the sidewall will provide clear visual evidence of tampering.

Another embodiment of the universal additive port cap assembly of the present invention comprises a housing having a clamshell configuration, including two housing segments, movably interconnected by a "tethered hinge". The tethered hinge includes structural and operative features which facilitate a variable dimension and disposition of the housing segments relative to one another and accordingly, a variable dimension and/or configuration of the housing interior. Moreover, the relative disposition of the housing segments as well as the dimensioning of the housing interior when the additive port cap is contained therein, will correspond or adapt to the dimension, configuration and/or overall structure of at least the exterior of the contained additive port. As a result, the "universal" adaptation of the additive port cap assembly to anyone of a possible plurality of differently structured additive ports is accomplished.

The tethered hinge comprises at least one but preferably a plurality of elongated tethers, disposed in spaced relation to one another and collectively extending transversely to an axial length of the two housing segments, in movably interconnecting relation thereto. Further, each of the one or more elongated tethers is formed of a flexible material, which may also be at least minimally elastic, along at least a majority of the lengths thereof. Also, the opposite longitudinal ends of the one or more tethers are fixedly attached to correspondingly disposed longitudinal sides of different ones of the two housing segments of the clamshell configuration. Moreover, the structural and operative features of the tethered hinge, including the one or more elongated tethers, provides a spacing between the correspondingly disposed longitudinal sides of the two housing segments. This in turn allows a freedom of movement between these longitudinal sides which in turn facilitates the aforementioned possible variance in the disposition and/or orientation of the housing segments relative to one another. In cooperation therewith, the dimension and configuration of the interior of the housing, when the aforementioned closure structure is selectively disposed in the attached orientation may also be varied to conform to that of the contained additive port.

Therefore, as will be explained in greater detail hereinafter, the disposition and structuring of the closure structure facilitates the disposition of this embodiment of the additive port cap assembly in an appropriate operative position relative to the additive port disposed within the housing interior. More specifically, the closure structure may include a retention assembly and/or a ratchet assembly including two ratchet segments. The cooperative structuring of these two ratchet segments facilitates their disposition in a fixed, mating engagement with one another. The fixed mating engagement further comprises an at least partially enclosed, access restrictive disposition of the plurality of ratchet segments. Moreover, the disposition of the two ratchet segments in the attached orientation may be accomplished by a clamping action being disposed on the two housing segments. Such a selective and variable clamping force or action will result in the disposition of the two housing segments in close but variable proximity and/or surrounding, confronting relation to the additive port within the housing interior. This in turn will result in the retaining structure being disposed in the retaining relation/engagement with the contained additive port, thereby further defining the operative position of this embodiment of the universal additive port cap.

Yet another embodiment of the universal additive port cap assembly of the present invention comprises a housing having a generally "collet" configuration when operatively disposed relative to the attendant cover thereof. Further, in this embodiment the housing and the cover may in fact be to independent pieces movably connected to one another by the closure structure. The closure structure comprises a two retention segments and/or to ratchet segments respectively disposed on the interior surface of the housing and an exterior surface of the cover. This facilitates the cover being at least partially disposed within an interior of the housing, in at least partially covering or closing relation to the housing interior.

This additional embodiment of the universal additive port cap assembly further includes the retaining structure disposed on the cover and movable therewith within the housing interior. In cooperation therewith, the housing includes a substantially frustoconical or converging interior surface configuration. As a result, movement of the cover within the housing will dispose the converging interior surface portions of the housing into movable engagement with the retaining structure. This in turn will result in a change or variance in the disposition, configuration and/or dimension of the retaining structure when disposed in retaining engagement with the contained additive port. As a result, this embodiment may represent a structural modification of the other embodiments of the universal port cap assembly of the present invention, while being operationally similar. Such operational similarity includes the variable dimensioning and/or configuring of the retaining structure as it moves into the interior of the housing in movable engagement with the corresponding converging surfaces thereof. The retaining structure will thereby will be forced "inwardly" into clamping engagement with the contained additive port and thereby at least partially correspond and/or adapt to a dimension, configuration and or overall structure of the additive port in the housing interior.

Yet additional features of this embodiment of the universal additive port cap assembly of the present invention comprises a finger engageable wing structure including a pair of oppositely disposed wings or finger engaging members connected to the exterior of the housing and extending outwardly there from in transverse relation to the axial length of the housing. As such, disposition of the housing and the cover in the operative position and in retaining engagement with the contained additive port can be accomplished by a single hand of a user manipulating the cap assembly in a manner similar to that associated with the operation of a syringe plunger and barrel.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying Figures, the present invention is directed to an additive port cap assembly which is capable of being used "universally" with any one of a possible plurality of differently dimensioned, configured and/or structured additive ports of an IV container. Moreover, one or more of the embodiments of the present invention may include tamper evident capabilities.

Therefore, while the one or more preferred embodiments of the universal additive port cap assembly of the present invention, generally indicated hereinafter as 10, 10' 10", may include at least some different structural and operative features, the commonality of each embodiment includes a structuring capable of assuming an operative position, at least partially enclosing a contained additive port in a retained, access preventing manner. Further, as also explained in greater detail hereinafter, one or more of the universal additive port cap embodiments include tamper evident capabilities comprising breakage, deformation and/or at least a partial destruction thereof.

Figure 1:
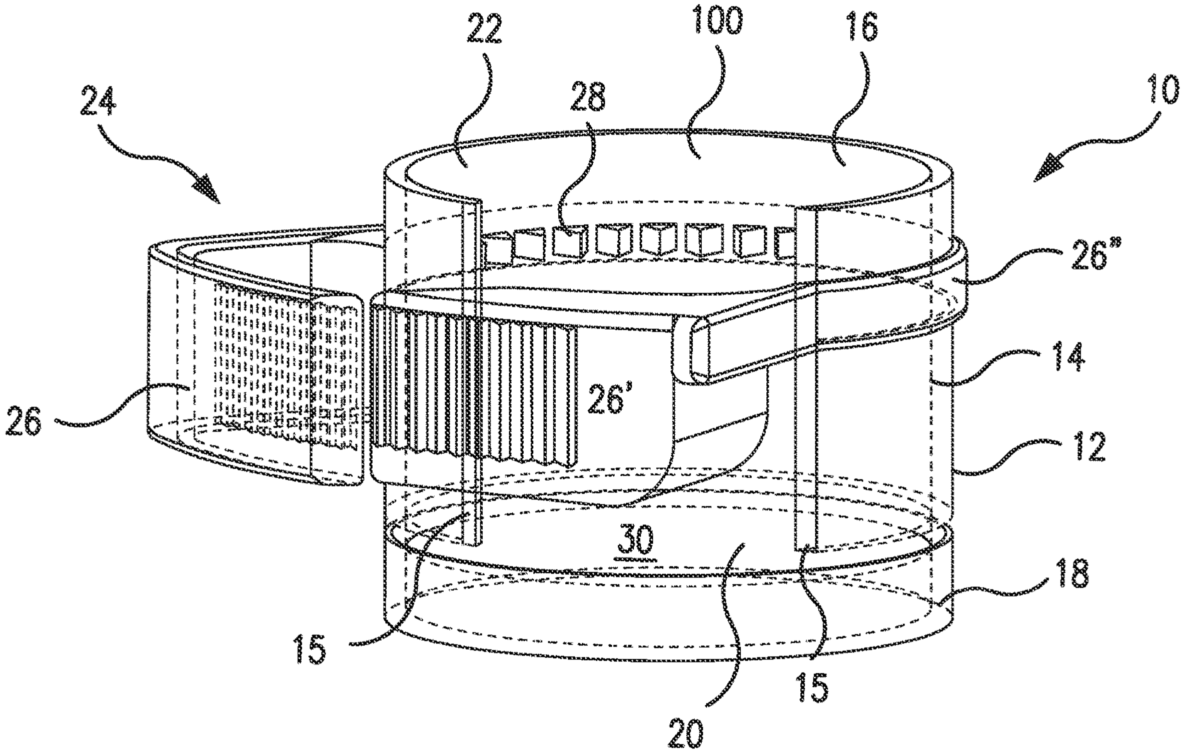
FIG. 1 is a perspective view of one embodiment of the universal cap assembly of the present invention.

With primary reference to FIG. 1, the represented universal additive port cap assembly 10 includes a housing 12 comprising a shell or more specifically a flexible material side wall 14 disposed in at least partially surrounding relation to an interior 16 of the housing 12. In addition, a cover 18 is movably and removably connected to the flexible side wall 14 by a frangible structure including at least one frangible member 20. As represented, the cover 18 is disposed in at least partially covering and/or enclosing relation to the interior 16 of the housing 12 in substantially opposing relation to the access opening 22 of the housing 12. As such, the cover 18 is disposed and structured to prevent access to the contained additive port, schematically represented as 100, such as by the introduction of a syringe or other substance dispensing instrument into the housing interior 16.

As also represented, the additive port cap assembly 10 includes a closure structure generally indicated as 24 including a plurality of at least two retention segments, which are preferably defined by ratchet segments 26 and 26'. As such, the closure structure 24 may be defined by a ratchet assembly including the two ratchet segments 26 and 26'. Also, the closure structure 24 includes an elongated band or like member 26" which may be connected to and extend around the exterior of the flexible wall 14. Selective and adjustable disposition of the closure structure 24 between the open position, as represented in FIG. 1 into a closed position, disposes the ratchet segments 26 and 26' into an attached orientation relative to one another. The disposition, as well as the structural and operative features of the ratchet segments 26 and 26', are such as to maintain the closure assembly in a fixed, mating engagement with one another which is resistant to disconnection of the two ratchet segments 26 and 26'.

Additional structural features of the embodiment of the universal adaptive port cap assembly 10 includes a retaining structure 28 formed on or fixedly connected to the interior surface of the housing 12 and flexible side wall 14. As represented in FIG. 1, the retaining structure comprises in the illustrated embodiment a plurality of outwardly extending projections or "teeth" extending along the interior surface of the flexible sidewall 14 either continuously, as represented, or in a plurality of spaced apart segments.

The degree or amount of flexibility of the flexible side wall 14 is such as to facilitate its contraction and expansion about and/or relative to the housing interior 16, due at least in part to the movable attachment to the cover 18. Therefore, the flexible side wall 14 is adjustably positional to define a variable dimension and/or configuration of the housing 12 and housing interior 16, and the flexible side wall 14 itself, upon disposition of the closure structure 24, including the retention and or ratchet segments 26 and 26' into the attached orientation. As set forth herein, the attached orientation comprises a fixed, mating engagement of the ratchet segments 26 and 26' with one another, which prevents and/or is resistant to disconnection thereof. Moreover, the fixed, mating engagement of the attached orientation of the closure structure 24 further comprises the retention and/or ratchet segments 26 and 26' being disposed in at least partially closing, clamping relation to the housing 12 and or flexible sidewall 14. Such a closing, clamping relation is further defined by the band 26" disposed in surrounding relation to the exterior of the flexible side wall 14. Accordingly, when in the attached orientation, and depending on the "tightness" or degree of closure of the ratchet segments 26 and 26', a clamping action will be exerted on the flexible side wall 24 by the fixed mating engagement of the segments 26 and 26' as well as the clamping force exerted on the exterior of the side wall 14 by the band 26". In contrast, a "looser" connection between the ratchet segments 26 and 26' will result in a lesser inward flexure of the sidewall 14 relative to the housing interior 16. Therefore, the degree of tightness or looseness of the of the closure structure 24 establishes the appropriate dimension, configuration and disposition of the housing 12, the flexible sidewall 14, a retaining structure 28 and the housing interior 16 to correspond and/or adapt to at least the exterior dimension, configuration and overall structure of the contained additive port 100, and thereby at least partially established the operative position of the additive port cap assembly 10.

As also represented in FIG. 1, the additive port cap assembly 10 comprising a flexible side 14 wall additionally includes an open configuration. The open configuration is at least partially defined by an open space 30 disposed between spaced apart, but substantially correspondingly positioned, free longitudinal ends or sides 15 of the sidewall 14. The aforementioned variance of the housing 12, including its interior 16, to accommodate additive ports of different structures, is further facilitated by the closure structure 24 disposed in overlying, covering and/or closing relation to the open space 30 at least partially defining the open configuration. Therefore, selective positioning of the closure structure 24 in the attached orientation will result in an at least partial closure and inward flexing of the flexible side wall 14. The flexible side wall 14 will then be forcibly disposed in surrounding, at least partially confronting relation, to the contained additive port 100 disposed within the housing interior 16. This in turn will result in the retaining structure 28 disposed in the aforementioned retaining engagement with the contained additive port 100.

Therefore, the operative position of the additive port cap assembly 10 comprises the retaining structure disposed in retaining engagement with the additive port 100, disposed within the housing interior 16 concurrent to the attached orientation of the closure structure 24. The selective disposition of the closure structure 24 into the attached orientation will in turn cause and inward, surrounding disposition or flexure of the flexible side wall 14 so as to establish the retaining engagement of the retaining structure 28 with the additive port 100 and the general conformance of the dimension, configuration, etc. of the housing interior 16 and flexible side wall 14 to that of the contained additive port 100. In contrast, if the contained additive port 100 as an exterior dimension, configuration and/or overall structure then the housing interior 16, when the flexible sidewall 14 is in its normal or original position, the closure assembly 24 may be more "loosely" disposed in the attached orientation, thereby facilitating a possible outward flexure of the sidewall 14 to accommodate the larger structural configuration of the contained additive port 100, when the additive port cap assembly 10 is in the operative position.

Accordingly, the "universal" nature of the additive port cap assembly 10 includes the interior dimension, configuration, and/or position of the housing 12 and flexible side wall 14, to at least partially surround and concurrently correspond and adapt to at least the exterior dimension, configuration and overall structure of any one additive port 100 of a possible plurality of different additive ports, which are disposed within the housing interior 16. Moreover, the ability to selectively vary the dimension, configuration and disposition of the housing 12, flexible side wall 14, housing interior 16, retaining structure 28 and the closure structure 24 relative to one another further facilitates its "universal" use, with any one of a possible plurality of different additive ports of an IV container.

As set forth above, the additive port cap assembly 10 may include tamper evident capabilities. As indicated herein, the flexible side wall 14 of the adaptive port cap assembly 10 is movably and removably connected to the cover 18, wherein the cover 18 is disposed in overlying relation to the housing interior 16 and in access preventing relation to the contained additive port 100. The frangible structure, including at least one frangible member 20 serves to removably interconnect the cover 18 to the movable, flexible side wall 14. Therefore, access to the additive port within the housing interior 16 may be accomplished by a removal, breakage and/or deformation of the frangible member 20. In turn, the cover 18 will be displaced from its access restricting position relative to the contained additive port 100. Such breakage, removal or deformation of the cover 18 relative to the flexible sidewall 14 will be clear visual evidence of tampering or attempted access to the contained additive port 100.

Figure 2:
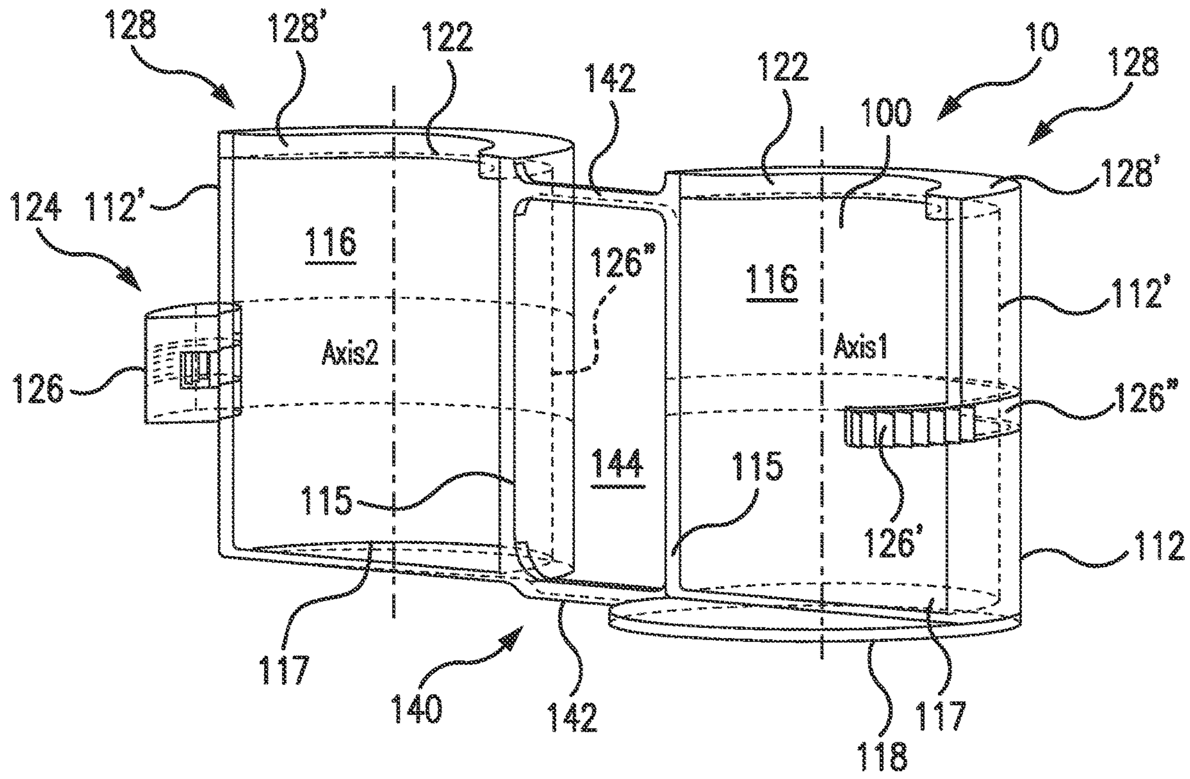
FIG. 2 is a perspective view of another embodiment of the universal cap assembly of the present invention.

As represented in FIG. 2, another embodiment of the universal additive port cap assembly is generally indicated as 10' and comprises a housing 112 having a clamshell configuration, including two housing segments 112'. The two housing segments 112' are movably interconnected by a "tethered hinge", generally indicated as 140. The tethered hinge 140 includes structural and operative features which facilitate a variable dimension and disposition of the housing segments 112' relative to one another and accordingly a variable dimension and/or configuration of the housing interior 116, when the housing segments 112' are in a closed position concurrent to the closure assembly 124 being in the attached orientation. Moreover, the relative disposition of the housing segments 112' as well as the dimensioning of the housing interior 116, when the additive port cap 100 is contained therein, will correspond or adapt to the dimension, configuration and/or overall structure of the contained additive port 100. As a result, the "universal" adaptation of the additive port cap assembly 10' to any one 100 of a possible plurality of differently structured additive ports is thereby facilitated.

Additional features of the universal additive port cap assembly 10' includes a cover 118 secured to one end of at least one of the housing segments 112' in substantially opposing relation to the access opening 122. As should be apparent, disposition of the housing segments 112' from the open position as represented in FIG. 2 into a closed position serves to position the cover 118 in overlying, covering relation to corresponding ends 117 of the housing segments 112'. The universal adaptive port cap assembly 10' also includes a closure structure 124 including two retention segments 126 and 126'. The retention segments 126 and 126' may be in the form of rachet segments thereby at least partially defining the closure structure 124 as a ratchet assembly. The closure 124 also includes surrounding band segments 126" extending from the respective rachet segments 126 and 126' around respective ones of the house segments 112'. Accordingly, when the closure structure 124 is disposed in a closed position, thereby selectively disposing the rachet segments 126 and 126' in the attached orientation, a clamping force will be exerted on the housing segments 112'. Further as with the embodiment of FIG. 1, when in the attached orientation, the rachet segments 126 and 126' will be in a fixed, mating engagement with one another thereby disposing the housing segments 112' in a closing, clamping relation to one another.

As also represented in FIG. 2, at least one of the retention or rachet segments, as at 126, has a closed base through and into which the other retention or rachet segment 126' passes. As a result, the attached orientation of the closure structure 124 can serve to position the rachet segments 126 and 126' in a non-accessible relation to the exterior thereof. As a result, separation or disconnection of the closure structure 124 will be prevented or significantly restricted.

Yet additional features of the universal adaptive port cap 10' includes a retaining structure generally indicated as 128 and including two retaining segments 128', each formed on and at least partially within a different one of the housing segments 126'. When the housing 112 is in a closed position, the retaining segments 128' will also effectively "close" in generally surrounding relation to the access opening 122 and in retaining relation and/or retaining engagement with the additive port 100 contained within the interior 116 of the housing 112.

The tethered hinge 140 comprises at least one but preferably a plurality of elongated tethers 142, disposed in spaced relation to one another and collectively extending transversely to an axial length of the two housing segments 112', in movably interconnecting relation thereto. Further, each of the one or more elongated tethers 142 is formed of a flexible material, which may also be at least minimally elastic, along at least a majority of the lengths thereof. Also, the opposite longitudinal ends 144 of the one or more tethers 142 are fixedly attached to correspondingly disposed longitudinal sides 115 of different ones of the two housing segments 112' of the clamshell housing 112. Moreover, the structural and operative features of the tethered hinge 140, including the one or more elongated tethers 142, provides a spacing 144 between the correspondingly disposed longitudinal sides 115 of the two housing segments 112'. This in turn allows a freedom of movement between these longitudinal sides 115 which in turn facilitates the aforementioned possible variance in the relative disposition and/or orientation of the housing segments 112' relative to one another, including when the closure structure 124 and the rachet segments 126 and 126' are in the attached orientation. In cooperation therewith, the dimension and configuration of the interior 116 of the housing 112, when the aforementioned closure structure 124 is selectively disposed in the attached orientation may also be varied to conform to that of the contained additive port 100.

It is of note that the structural and operative features of the tethered hinge 140 is distinguishable from a fixed hinge and/or living hinge which is structured to facilitate pivotal movement of clamshell housing segments relative to one another, between open and closed positions. However, such common and/or conventional pivot type hinges do not allow a degree of freedom of movement, other than pivotal movement, between substantially correspondingly disposed longitudinal sides or edges 115 relative to one another. Due to the flexibility of the one or more tethers 142 the longitudinal sides 115 are still capable of relative movement, other than pivotal movement, even when the closure structure 124 is in the aforementioned attached orientation.

Therefore, the disposition and structuring of the closure structure 124 facilitates the disposition of the additive port cap assembly' in an appropriate operative position relative to the additive port 100 disposed within the housing interior 116. More specifically, the closure structure 124 may include the retention or ratchet assembly defined by the two retention and/or rachet segments 126 and 126'. The cooperative structuring of these two ratchet segments 126 and 126' facilitates their disposition in a fixed, mating engagement with one another. The fixed mating engagement further comprises an at least partially enclosed, access restrictive disposition of the rachet segments 126' within the enclosed base of the ratchet segment 126. As set forth above, the disposition of the two ratchet segments 126 and 126' in the attached orientation may be accomplished by a clamping action being disposed on the two housing segments 112'. Such a selective and variable clamping action will result in the disposition of the two housing segments 112' in a close but variable proximity and/or surrounding, confronting relation to the additive port 100 within the housing interior 116. This in turn will result in the retaining structure 128 being disposed in the retaining relation and/or engagement with the contained additive port 100, thereby further defining the operative position of this embodiment of the universal additive port cap assembly 10'.

As with one or more embodiments of the present invention, the operative position of the universal adaptive port cap assembly 10' comprises the retaining structure disposed in retaining relation/engagement with the additive port 100 disposed within the interior 116 of the housing 112 concurrent to the attached orientation of the closure structure 124. Further, the attached orientation of the closure structure 124 may cause a variance in the interior of the housing 116 which, in the embodiment of FIG. 2 is also defined by a substantially enclosing, retaining, at least partially surrounding relation of the flexible material tethered hinge 140 relative to the contained additive port 100 within the housing interior 116. As set forth above, the "tightness" or "looseness" of the attached orientation of the rachet segments 126 and 126' will affect and/or determine the variance in the disposition and orientation of the housing segments 112' and the dimension and/or configuration of the housing interior 116, when the additive port cap assembly 10' is in the operative position.

Figure 3:
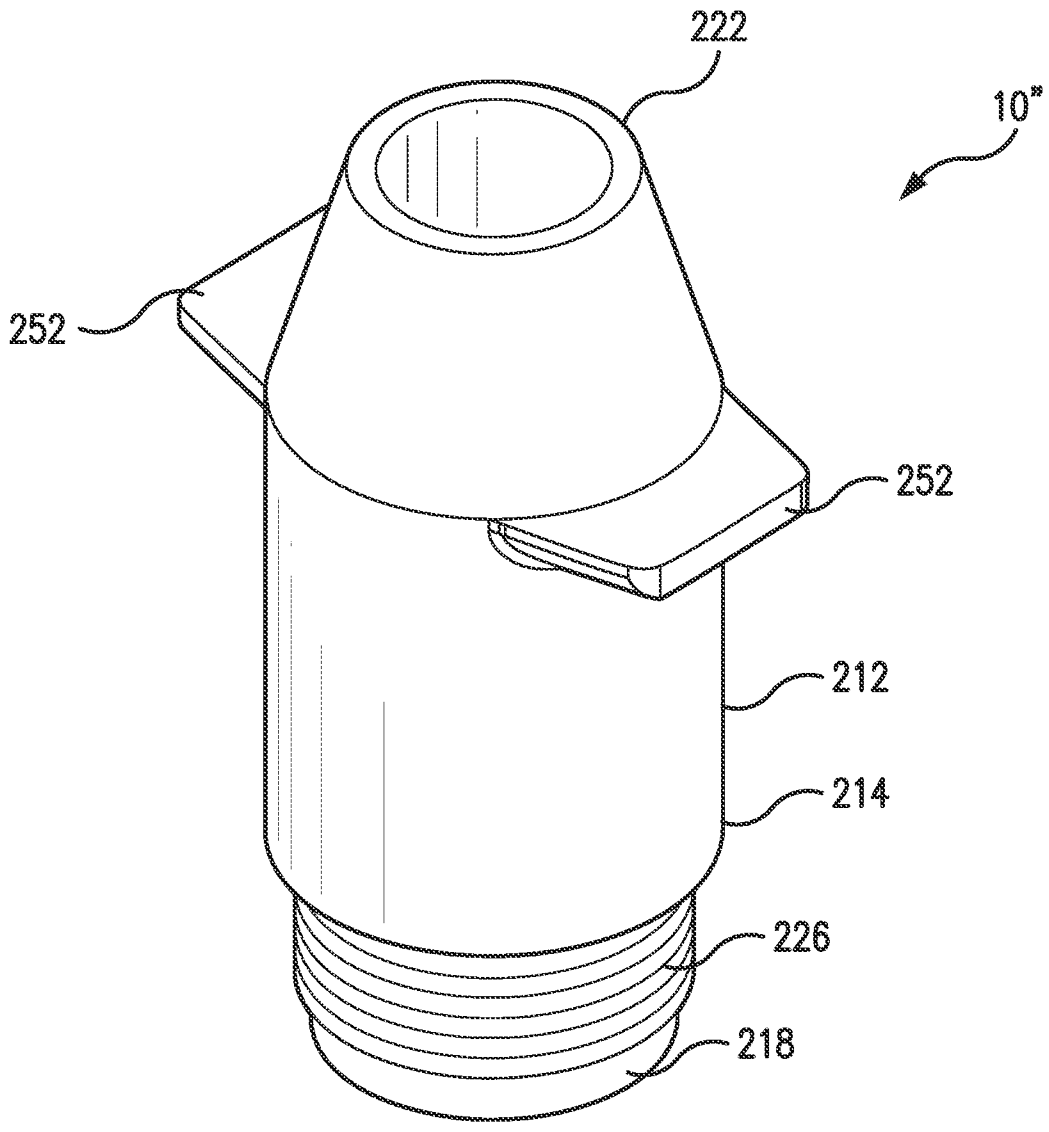
FIG. 3 is an external perspective view of the embodiment of FIG. 3 in assembled form.

With reference to FIG. 3, in yet another embodiment, the present invention comprises the universal additive port cap assembly 10" including a housing 212 having a generally "collet" configuration when operatively disposed relative to the attendant cover 218 thereof. Further, in this embodiment the housing 212 and the cover 218 may in fact be two independent pieces movably connected to one another by the closure structure 224. The closure structure 224 comprises a two retention segments and/or two ratchet segments 226 and 226' respectively disposed on the interior surface of the housing 212 and an exterior surface of the cover 218. This facilitates the cover 218 being movably and at least partially disposed within the interior 216 of the housing 212, in at least partially covering or closing relation to the housing interior 216.

This additional embodiment 10" of the universal additive port cap assembly further includes the retaining structure 228 disposed on the cover 218 and movable therewith within the housing interior 216. The retaining structure 228 includes at least one but preferably a plurality of flexible material "fingers" 228' having the outer or distal ends thereof dimensioned, structured and configured to exert a retaining force/engagement on the additive port 100 contained within the interior 216 of the housing 212, when the universal additive port cap 10" is in the aforementioned operative position.

With further regard to the closure structure 224, each of the two retention segments and/or two ratchet segments 226 and 226' include ratchet like teeth, ridges, ribs, etc. 227 and 229 respectively disposed in at least partially surrounding relation to the exterior surface of the cover 218 and the interior surface of the surrounding "collect" type sidewall 214 of the housing 212. As will be explained in greater detail hereinafter both the teeth/ridges 227 and 229 are collectively oriented in a somewhat downward slanted orientation, generally towards the bottom and 218' of the cover 218. This in turn facilitates movement of the cover 218 into the interior of the housing 212 towards the access opening 222, but prevents or significantly restricts movement of the cover 218 in the opposite direction, such as out through the open end 214' of the sidewall 214 of the housing 212. As a result, the retention and/or ratchet segments 226 and 226' can assume the aforementioned attached orientation comprising a fixed, mating engagement therebetween and a non-accessible position at least partially within the interior 216 of the sidewall 214 and housing 212.

Operative and structural features of the universal adaptive port cap assembly 10" include the housing 212 having a substantially frustoconical or converging interior surface configuration, as at 216'. As a result, movement of the cover 218 within the housing 212 will dispose the converging interior surface portions 216 of the housing 212 into movable, force inducing engagement with the plurality of retaining fingers 228' of the retaining structure 228. This in turn will result in a change or variance in the disposition, configuration and/or dimension of the retaining fingers to 28' and accordingly the retaining structure 228, as the retaining fingers 228' are forced inwardly into a clamping, retaining engagement with the contained additive port 100, which is disposed in at least partially surrounded relation to the retaining fingers 228'. As a result, the universal adaptive port cap assembly 10" may represent a structural modification of the other embodiments 10 and 10' of the universal port cap assembly of the present invention, while being operationally similar. Such operational similarity includes the variable dimensioning and/or configuring of the retaining structure 228 as it moves into the interior of the housing 212, with the cover 218 in force inducing engagement with the corresponding converging surfaces 216. The retaining structure 228 will thereby at least partially correspond and/or adapt to a dimension, configuration and or overall structure of the additive port 100 in the housing interior 216.

Figure 4:
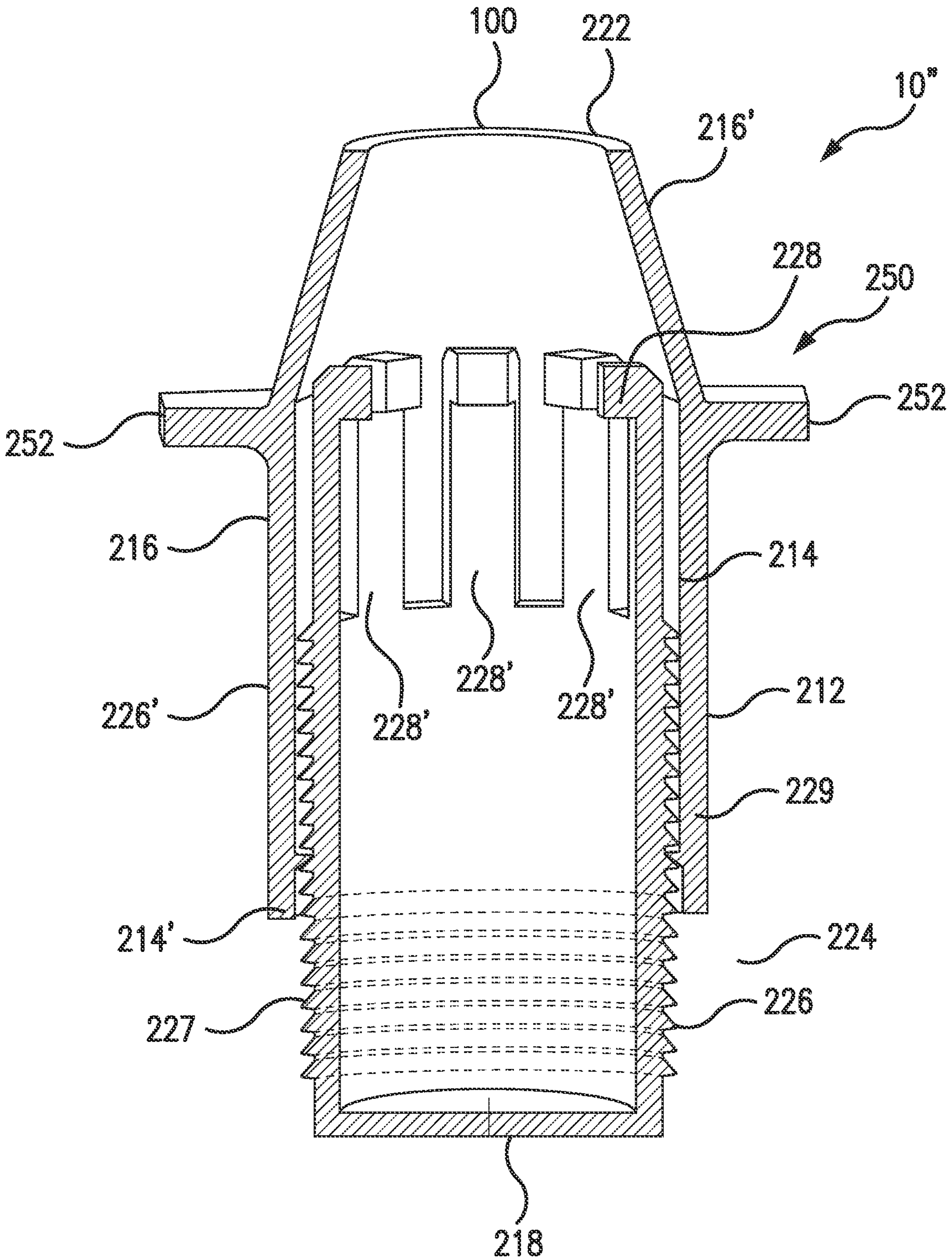
FIG. 4 is a longitudinal sectional view of yet another embodiment of the universal cap assembly of the present invention.

With reference to FIG. 4, yet additional features of one embodiment of the universal additive port cap assembly of the present invention comprises a finger engageable wing structure 250 including a pair of oppositely disposed wings or finger engaging members 252 connected to the exterior of the housing 212 and extending outwardly therefrom, in transverse relation to the axial length of the housing 212. As such, disposition of the housing 212 and the cover 218 in the operative position and in retaining engagement with the contained additive port 100 can be accomplished by a single hand of a user manipulating the cap assembly in a manner similar to that associated with the operation of a syringe plunger and barrel. More specifically, two fingers of one hand of a user can be placed, at the same time, in overlying relation to the two wings 252, concurrently to the thumb of the one hand placed in overlying engagement with the outer end 218' of the cover 218. The exertion by the one hand of a pushing force or action, similar to that used to operatively dispense fluid from a syringe will result in movement of the cover 218 into the interior 216 of the housing 212 and a force inducing engagement of the converging surface 216' with the plurality of retaining FIGS. 228', which in turn, will exert a clamping, retaining engagement of the plurality of fingers 228' with the contained additive port 100.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A cap assembly for protectively covering an additive port of an IV container, said cap assembly comprising:

a housing structured to receive the additive port in an operative position within a housing interior, an access opening formed in said housing in communicating relation with said housing interior, a cover substantially oppositely disposed to said access opening in at least partial covering relation to said housing interior, a retaining structure disposed within said housing interior and positional in retaining relation with the additive port, a closure structure adjustably disposed on said housing in an attached orientation, concurrent to said operative position, said housing comprising a flexible side wall movably connected to said cover and adjustably positioned to define a variable dimension of said housing interior, corresponding to that of the additive port in said operative position, a connecting structure including at least one frangible member movably and removably connecting said sidewall to said cover, said operative position comprising at least said retaining structure disposed in retaining engagement with the additive port within said housing, concurrent to said attached orientation of said closure structure.

2. The cap assembly as recited in claim 1 wherein said closure structure comprises a ratchet assembly including a plurality of rachet segments disposable in fixed, mating engagement with one another, concurrent to said attached orientation.

3. The cap assembly as recited in claim 2 wherein said fixed, mating engagement comprises a detachment preventative disposition of said plurality of ratchet segments with one another.

4. The cap assembly as recited in claim 3 wherein said fixed, mating engagement further comprises an at least partially enclosed, access restrictive disposition of said plurality of rachet segments.

5. The cap assembly as recited in claim 2 wherein said fixed, mating engagement comprises said closure structure disposed in an at least partially closing, clamping relation to said housing.

6. The cap assembly as recited in claim 1 wherein said side wall comprises an open configuration, including an open space disposed between substantially correspondingly disposed free ends of said sidewall.

7. The cap assembly as recited in claim 6 wherein said attached orientation comprises said closure structure disposed in overlying, at least partially closing relation to said open space.

8. The cap assembly as recited in claim 7 wherein said operative position further comprises said retaining structure disposed in clamping engagement with the additive port concurrent to said closure structure disposed in said attached orientation, in overlying, at least partially closing relation to said open space.

9. The cap assembly as recited in claim 7 wherein said closure structure comprises a ratchet assembly including a plurality of rachet segments disposable in fixed, mating engagement with one another, said fixed mating engagement comprising a detachment restrictive disposition of said plurality of rachet segments, concurrent to said operative orientation.

10. The cap assembly as recited in claim 1 wherein said housing comprises a clamshell configuration including two housing segments movably interconnected by a tethered hinge, said tethered hinge structured to define a variable dimension of said housing interior, corresponding to that of the additive port in said operative position.

11. The cap assembly as recited in claim 10 wherein said tethered hinge comprises at least one elongated tether extending transversely to an axial length of said two housing segments, in movably interconnecting relation therebetween; said at least one tether formed of a flexible material, having opposite longitudinal ends fixedly attached to different ones of said two housing segments.

12. The cap assembly as recited in claim 10 wherein said tethered hinge comprises a plurality of elongated tethers, disposed in spaced relation to one another and collectively extending transversely to an axial length of said two housing segments, in movably interconnecting relation thereto.

13. The cap assembly as recited in claim 12 wherein each of said plurality of tethers is formed of a flexible material along at least a majority of the length thereof and have opposite longitudinal ends fixedly attached to correspondingly disposed longitudinal sides of different ones of said two housing segments.

14. The cap assembly as recited in claim 13 wherein said correspondingly disposed longitudinal sides of different ones of said two housing segments are movably disposed in spaced relation to one another along respective lengths thereof.

15. The cap assembly as recited in claim 10 wherein said closure structure comprises a ratchet assembly including a plurality of rachet segments disposable in fixed, mating engagement with one another; said fixed, mating engagement further comprising an at least partially enclosed, access restrictive disposition of said plurality of rachet segments.

* * * * *